(12) United States Patent
Miyagawa et al.

(10) Patent No.: US 9,051,024 B2
(45) Date of Patent: Jun. 9, 2015

(54) ELECTRIC VEHICLE WITH MOTOR DRIVE SECTION

(75) Inventors: Toru Miyagawa, Wako (JP); Kunihiko Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 577 days.

(21) Appl. No.: 13/368,670

(22) Filed: Feb. 8, 2012

(65) Prior Publication Data

US 2012/0222910 A1  Sep. 6, 2012

(30) Foreign Application Priority Data

Mar. 4, 2011 (JP) ................... 2011-047045

(51) Int. Cl.
| | |
|---|---|
| B60L 1/00 | (2006.01) |
| B62M 7/02 | (2006.01) |
| B60L 11/14 | (2006.01) |
| B60L 11/18 | (2006.01) |
| H02M 1/32 | (2007.01) |

(52) U.S. Cl.
CPC *B62M 7/02* (2013.01); *B60L 11/14* (2013.01); *B60L 11/1877* (2013.01); *B60L 2200/12* (2013.01); *B60L 2210/40* (2013.01); *B60L 2240/12* (2013.01); *H02M 2001/322* (2013.01); *Y02T 10/7005* (2013.01); *B62K 2202/00* (2013.01); *B62K 2204/00* (2013.01); *B62K 2208/00* (2013.01); *Y02T 10/7077* (2013.01); *Y02T 10/705* (2013.01); *Y02T 10/7241* (2013.01); *Y02T 10/70* (2013.01)

(58) Field of Classification Search
CPC ............... Y02T 10/7005; Y02T 10/705; Y02T 10/7088; Y02T 90/14; B60L 11/1803; H02P 27/06

USPC ............ 180/291, 65.1, 65.8; 318/400.3, 139; 320/166, 167; 701/22; 307/9.1, 10.1; 903/903

See application file for complete search history.

(56) References Cited

U.S. PATENT DOCUMENTS

| | | | | |
|---|---|---|---|---|
| 2,239,289 | A | * | 4/1941 | Goodhue et al. ............... 318/432 |
| 4,136,659 | A | * | 1/1979 | Smith ............................ 123/598 |
| 4,917,411 | A | * | 4/1990 | Cummins ..................... 290/38 R |
| 5,146,095 | A | * | 9/1992 | Tsuchiya et al. ............ 290/38 R |
| 5,404,088 | A | * | 4/1995 | Nanos ............................ 318/751 |
| 5,504,414 | A | * | 4/1996 | Kinoshita ..................... 180/65.8 |
| 5,534,364 | A | * | 7/1996 | Watanabe et al. ................ 429/61 |
| 5,619,107 | A | * | 4/1997 | Shinohara et al. ............. 318/139 |
| 5,629,603 | A | * | 5/1997 | Kinoshita ..................... 180/65.8 |
| 5,635,804 | A | * | 6/1997 | Tanaka et al. .................. 318/139 |

(Continued)

FOREIGN PATENT DOCUMENTS

| | | |
|---|---|---|
| DE | 10 2006 043 950 A1 | 3/2008 |
| DE | 10 2007 047 713 A1 | 4/2009 |

(Continued)

*Primary Examiner* — Brodie Follman
(74) *Attorney, Agent, or Firm* — Squire Patton Boggs (US) LLP

(57) ABSTRACT

An electric vehicle includes a motor drive section that supplies electric power from a main battery to a motor to drive the motor. The motor drive section can include an inverter configured to convert direct current from the main battery into alternating current, and a capacitor configured to stabilize an operation of the inverter. A resistor is configured to discharge electric charge of the capacitor, and discharge operation unit can be configured to manually control the resistor to discharge the electric charge of the capacitor.

8 Claims, 7 Drawing Sheets

(56) References Cited

U.S. PATENT DOCUMENTS

| | | | |
|---|---|---|---|
| 5,804,973 A * | 9/1998 | Shinohara et al. | 324/548 |
| 5,998,884 A * | 12/1999 | Kitamine et al. | 307/10.1 |
| 6,002,221 A * | 12/1999 | Ochiai et al. | 318/139 |
| 6,037,726 A * | 3/2000 | Tabata et al. | 318/139 |
| 6,066,928 A * | 5/2000 | Kinoshita et al. | 318/139 |
| 7,096,984 B2 * | 8/2006 | Ono et al. | 180/65.1 |
| 7,116,543 B2 * | 10/2006 | Kim et al. | 361/251 |
| 7,557,543 B2 * | 7/2009 | Prakash et al. | 320/166 |
| 7,956,488 B2 * | 6/2011 | Kobayashi et al. | 307/9.1 |
| 8,091,665 B2 * | 1/2012 | Kuno | 180/65.285 |
| 8,186,465 B2 * | 5/2012 | Oyobe et al. | 180/65.275 |
| 8,441,224 B2 * | 5/2013 | Sumi et al. | 318/801 |
| 8,558,492 B2 * | 10/2013 | Oh et al. | 318/400.21 |
| 8,602,140 B2 * | 12/2013 | White et al. | 180/65.1 |
| 8,612,073 B2 * | 12/2013 | Fuji et al. | 701/22 |
| 8,698,347 B2 * | 4/2014 | Ishigaki | 307/9.1 |
| 8,829,861 B2 * | 9/2014 | Hamanaka et al. | 320/166 |
| 2004/0069549 A1 * | 4/2004 | Ono et al. | 180/65.8 |
| 2009/0295224 A1 * | 12/2009 | Kobayashi et al. | 307/9.1 |
| 2010/0200377 A1 * | 8/2010 | Arakawa | 200/61.58 R |
| 2010/0318248 A1 * | 12/2010 | Higuchi et al. | 701/22 |
| 2011/0115416 A1 * | 5/2011 | Oh et al. | 318/139 |
| 2011/0234176 A1 * | 9/2011 | Nakamura et al. | 320/166 |
| 2012/0222910 A1 * | 9/2012 | Miyagawa et al. | 180/291 |
| 2013/0035819 A1 * | 2/2013 | Wolft | 701/22 |
| 2013/0234510 A1 * | 9/2013 | Nakamura | 307/10.1 |
| 2013/0257149 A1 * | 10/2013 | White et al. | 307/10.1 |

FOREIGN PATENT DOCUMENTS

| | | |
|---|---|---|
| JP | 2003-061344 A | 2/2003 |
| JP | 2006-224772 A | 8/2006 |
| JP | 2008-228507 | 9/2008 |
| WO | 2008/031669 A1 | 3/2008 |

* cited by examiner

ELECTRIC VEHICLE WITH MOTOR DRIVE SECTION

BACKGROUND

1. Field

The present invention relates to an electric vehicle that provides an easy accessibility to electronic components.

2. Description of the Related Art

Patent Literature 1 (JP-A-No. 2008-228507) discloses a layout of control means, which executes vehicular control, and a wiring connection on a battery side in a housing space, which houses a battery. The control means and the wiring connection are disposed at a position where they are accessible only in a state in which the battery is dismounted from the housing space, and they are not accessible in a state in which the battery is mounted.

It is necessary to pay attention to the discharge of electric charge accumulated in a capacitor even when the battery is dismounted during maintenance, insofar as the capacitor of an electronic component is electrically charged.

SUMMARY

The present invention has been achieved in view of the above-mentioned problems and has an object to provide an electric vehicle that provides good discharge of the residual electric charges of a capacitor, thereby ensuring an easy accessibility to the electronic components.

According to a first embodiment, an electric vehicle can include a motor drive section that supplies electric power from a battery to a traveling motor to drive the traveling motor. The motor drive section can include an inverter configured to convert direct current from the battery into alternating current. A capacitor can be configured to stabilize an operation of the inverter. A discharge unit can be configured to discharge electric charge of the capacitor. A discharge operation unit can be configured to manually make the discharge means to discharge the electric charge of the capacitor.

According to another embodiment, the discharge operation unit is disposed such that the motor drive section is accessible by manually operating the discharge operation unit when accessing the motor drive section.

According to another embodiment, the discharge operation unit is a manual switch configured to connect a discharge circuit including the discharge unit to the capacitor.

According to another embodiment, the motor drive section is interposed between the battery and the traveling motor, and has a main contactor connecting the battery to the inverter of the motor drive section. A first switch can permit the main contactor to turn on. A second switch connects the discharge circuit to the capacitor. The discharge operation unit is configured to interlock the first switch with the second switch in order to turn on one of the first switch and the second switch and turn off the other.

According to another embodiment, a seat for a rider is provided, and the motor drive section is disposed below the seat.

In some embodiments, the discharge unit, which discharges the electric charge of the capacitor for stabilizing an operation of the inverter, and the discharge operation unit, which manually makes the discharge means to discharge the electric charge of the capacitor, are provided. This ensures good discharge of the residual electric charge of the capacitor of the motor drive section, thereby ensuring easy accessibility to the motor drive section as an electronic component when accessing the motor drive section during maintenance.

In some embodiments, the discharge operation unit is disposed such that the motor drive section is not accessible unless the discharge operation unit is manually operated when accessing the motor drive section. Accordingly, it is necessarily discharged when accessing the motor drive section.

In some embodiments, the discharge operation unit is a manual switch to connect the discharge circuit, which includes the discharge operation unit, to the capacitor, thus ensuring the discharge of the electric charge of the capacitor.

In some embodiments, the motor drive section is interposed between the battery and the traveling motor. The motor drive section has the main contactor connecting the battery to the inverter of the motor drive section, the first switch permitting the main contactor to turn on, and the second switch connecting the discharge circuit to the capacitor. The discharge operation unit turns on one of the first switch and the second switch and turns off the other. Thus, when discharging the electric charge of the capacitor, the main contactor is turned off. This prevents the motor drive section from driving the traveling motor when accessing the motor drive section.

In some embodiments, since the motor drive section is disposed below the seat, it is possible to shorten the wiring such as power lines supplied from the motor drive section to the traveling motor.

BRIEF DESCRIPTION OF DRAWINGS

FIG. 3 is the circuit diagram of the motor drive section shown in FIG. 1 in a state where the first switch is turned off, while the second switch is turned on.

FIG. 7 is a plan cross-sectional view of the configuration of the first switch shown in FIG. 4 in a state where the first switch is turned on.

DETAILED DESCRIPTION

Preferred embodiments of the electric vehicle according to the present invention will be described below by referring to the accompanying drawings.

Figure 1:
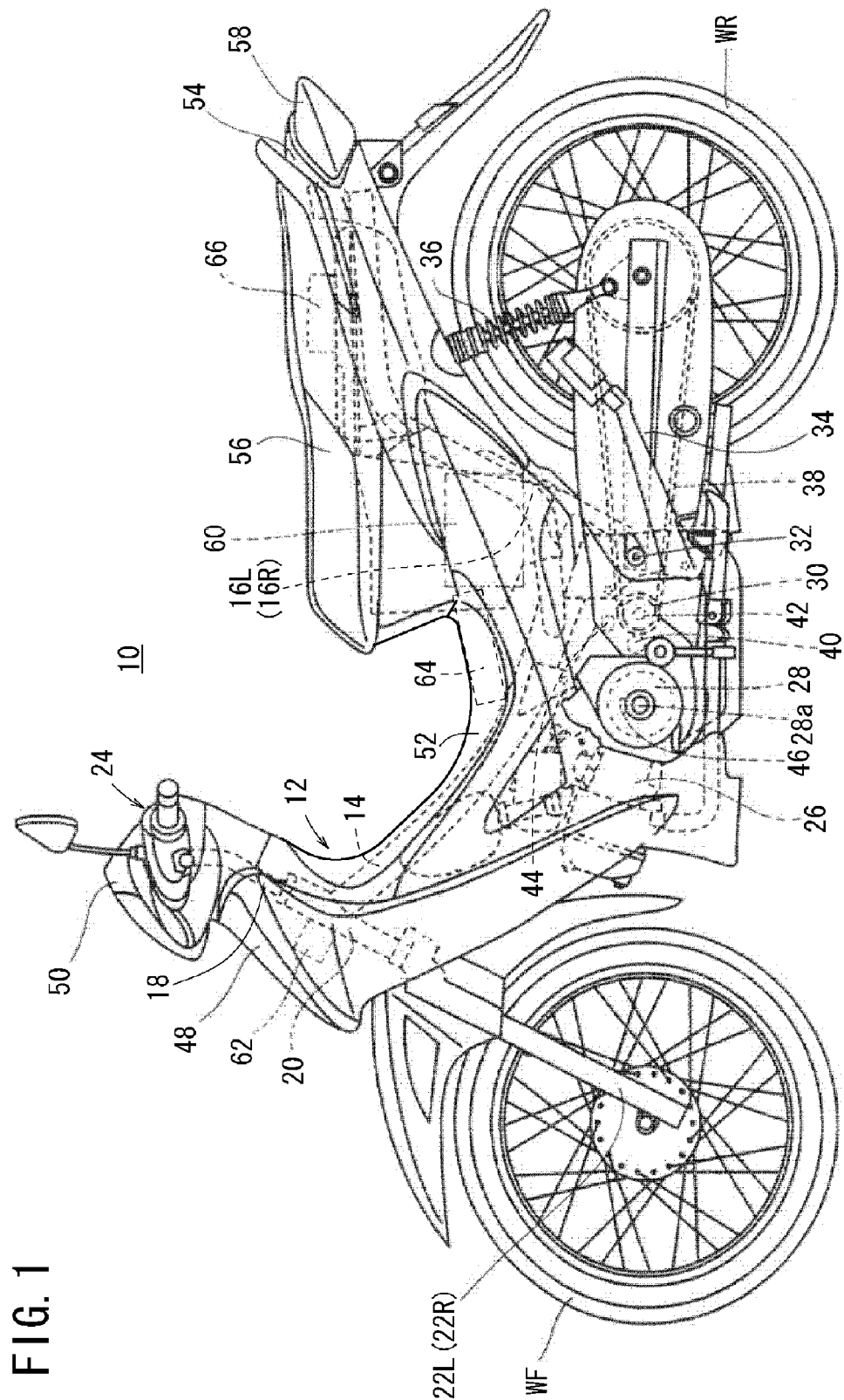
FIG. 1 is a schematic side view of an electric vehicle as a hybrid motorcycle according to an embodiment.

FIG. 1 is a left side view of an electric vehicle 10 as a hybrid motorcycle according to an embodiment. Mechanisms and components, which are each symmetrically provided in a vehicle body, are designated such that a reference sign with "L" appended designates one arranged in left-side, while a reference sign with "R" appended designates one arranged in right-side.

A vehicle body frame 12 has a main frame 14 and rear frames 16L and 16R, which are separated into left and right and extend rearward from the main frame 14. At the front end portion of the main frame 14, a head tube 20, which rotatably journals a steering stem 18, is provided. At the lower end portion of the steering stem 18, a pair of front forks 22L and 22R, which rotatably journal the front wheel WF, is provided. The front wheel WF is steerable with a handlebar 24 mounted above the steering stem 18.

At the lower side of the main frame 14, an engine 26 is suspended, and a motor such as a traveling motor 28 is mounted behind the engine such that a crankshaft of the engine and a rotary shaft 28a of the motor 28 are coaxially arranged. The crankshaft (rotary shaft 28a of the motor 28) of the engine 26 transmits rotation force to a drive sprocket 30 via power-transmitting device or means, not shown.

A front end portion of a swing arm 34, which supports a rear wheel WR, is swingably journaled to a pivot shaft 32 at the lower side of the main frame 14. The rear upper portion of the swing arm 34 is suspended on the rear frame 16 with a rear cushion 36. The drive sprocket 30 transmits rotation force to the rear wheel WR via, for example, a chain 38.

A transmission is mounted at the rear position of the rotary shaft 28a of the motor 28. The transmission has a main shaft 40 and a counter shaft 42, which interlock with the rotary shaft 28a. A vehicle speed sensor (vehicle speed detecting means) 44 is disposed at a proximity of the counter shaft 42. The vehicle speed sensor detects vehicle speed, which is speed of the electric vehicle 10. A rotation speed sensor 46 is disposed at the rotary shaft 28a. The rotation speed sensor 46 detects rotation speed of the crankshaft (rotary shaft 28a of the motor 28) of the engine 26.

A front cover 48 is disposed at the upper portion of the front forks 22L and 22R. The front cover is a part of a vehicle body cover, which covers the electric vehicle 10. A handlebar cover 50 is disposed above the front cover 48. At the back side of the head tube 20, a center cover 52, which continues into the front cover 48, is disposed as the vehicle body cover. At the rear of the center cover 52, a body cover 54 as the vehicle body cover is disposed. Above the body cover 54, a seat 56 for a rider to be seated is supported, while at the rear of the body cover 54, a tail lamp 58 is disposed.

Above the rear frames 16L and 16R and below the seat 56, a main battery 60 and a sub battery 62 are disposed. The main battery supplies the motor 28 with, for example, a voltage of 72V. The sub battery supplies the electronic components at the front side of the head tube 20 with, for example, a voltage of 12V. The electric power from the main battery 60 is supplied to the motor 28 via the motor drive section 64, which is disposed above the main frame 14 and below the seat 56.

Since the motor drive section 64 is disposed above the main frame 14 and below the seat 56, it is possible to shorten the wiring such as power lines supplied from the motor drive section 64 to the traveling motor. Since the main battery 60 is disposed above the rear frames 16L and 16R and below the seat 56 (disposed at a proximity of the motor drive section 64), it is possible to shorten the wiring such as power lines, which connects the motor drive section 64 and the main battery 60.

An ECU 66 is disposed at the rear upper portion of the rear frames 16L and 16R, and controls the engine 26 and the motor drive section 64 in response to operation of a throttle grip (not shown) at the handlebar 24. Thus, the engine 26 and the motor 28 output rotation force (drive power) according to the operation of the throttle grip.

Figure 2:
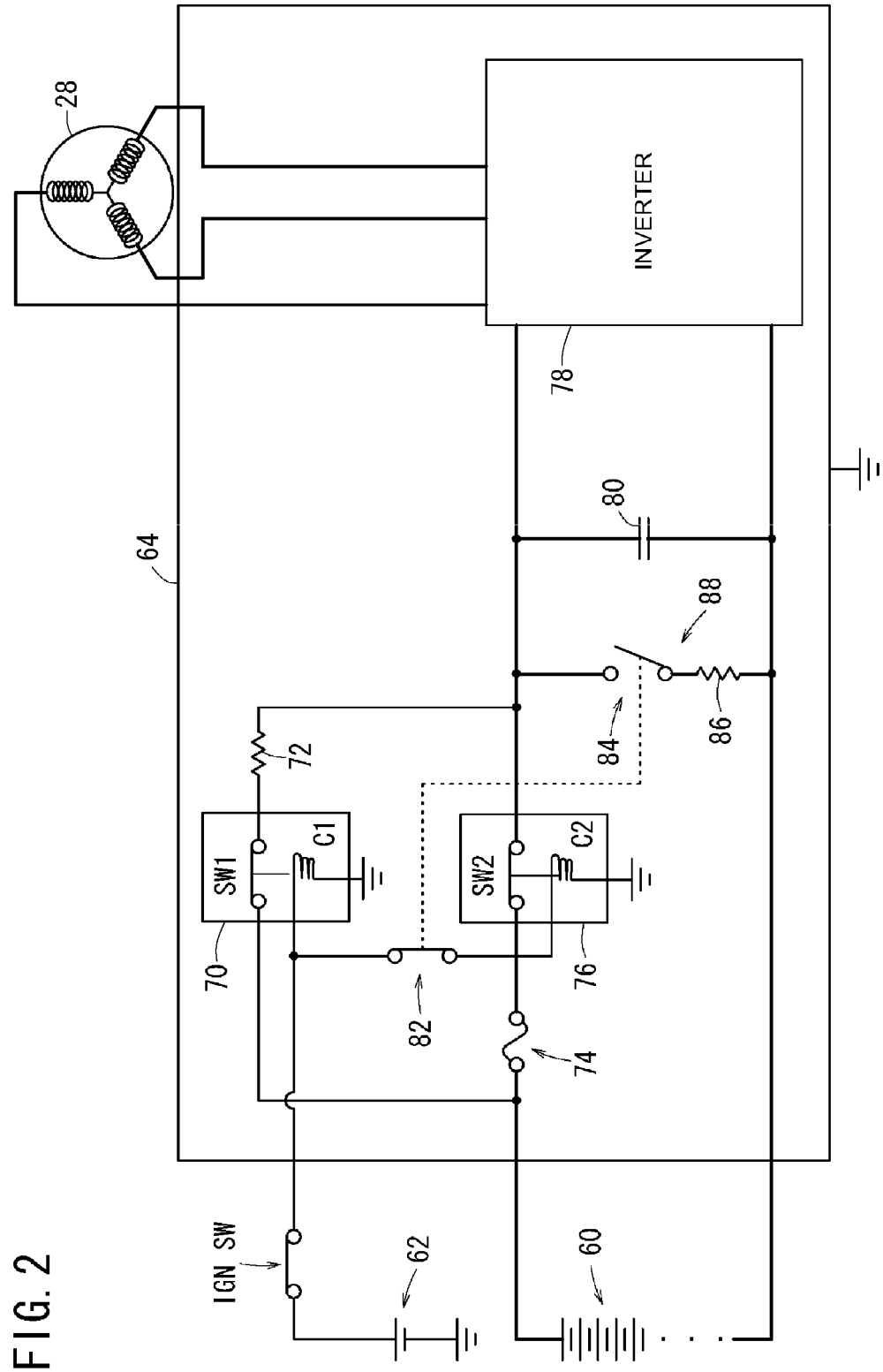
FIG. 2 is a circuit diagram of a motor drive section shown in FIG. 1 in a state where a first switch is turned on, while a second switch is turned off.
Figure 3:
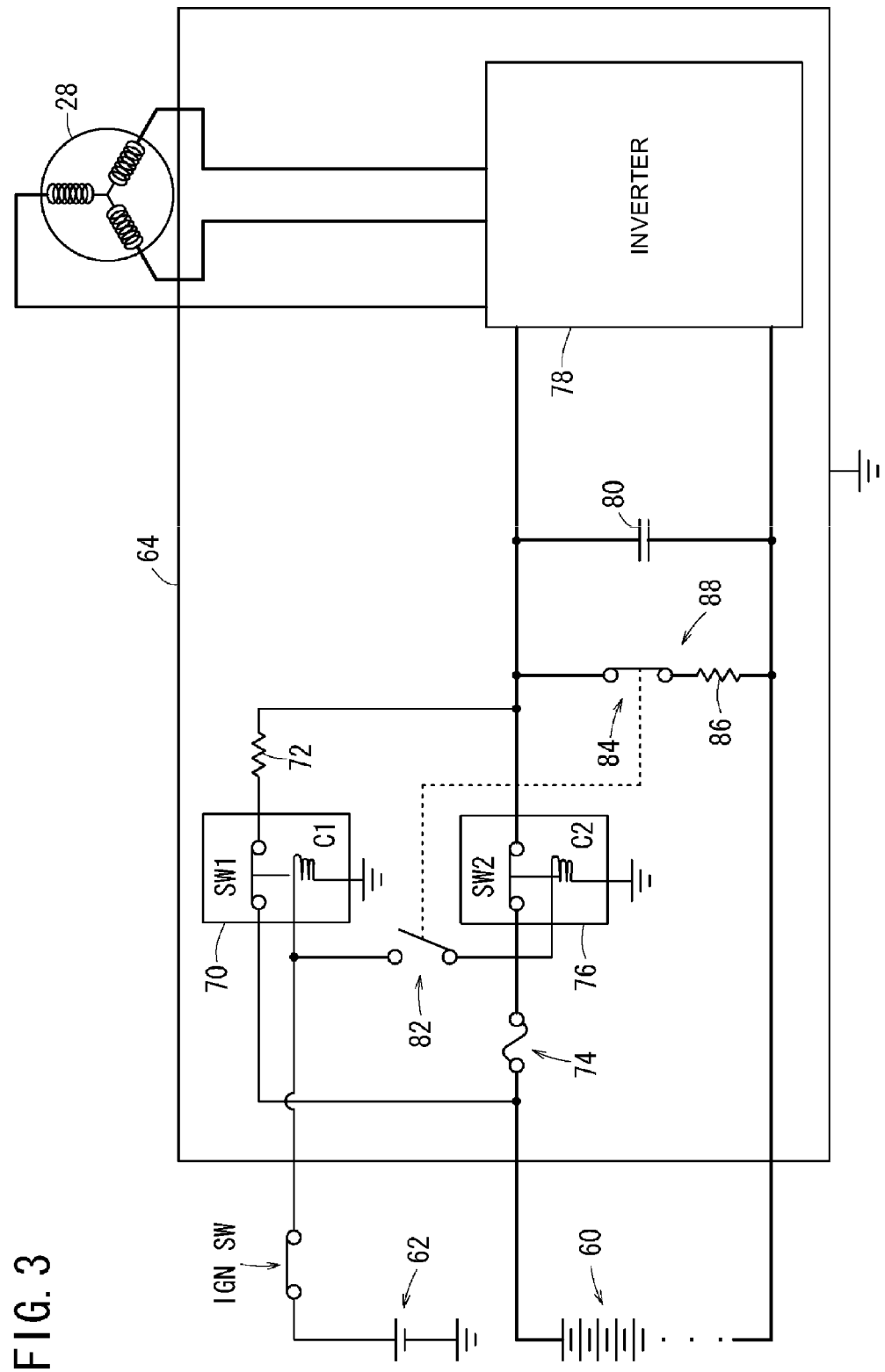

FIG. 2 and FIG. 3 are circuit diagrams of the motor drive section 64 shown in FIG. 1. The motor drive section 64 has a precharge relay 70, a resistor 72, a fuse 74, a main contactor 76, an inverter 78, a capacitor 80, a first switch 82, a second switch 84, and a resistor 86 functioning as a discharge means. FIG. 2 is a circuit diagram of the motor drive section 64 in a state where the first switch 82 is turned on, while the second switch 84 is turned off. FIG. 3 is a circuit diagram of the motor drive section 64 in a state where the first switch 82 is turned off, while the second switch 84 is turned on.

The switch SW1 of the precharge relay 70 and the resistor 72, and the fuse 74 and the switch SW2 of the main contactor 76, are connected in parallel between the inverter 78 and the positive electrode of the main battery 60. The precharge relay 70 has a coil C1, which is connected to the positive electrode of the sub battery via the ignition switch (main switch) IGNSW, while the main contactor 76 has a coil C2, which is connected to the positive electrode of the sub battery 62 via the first switch 82 and the ignition switch IGNSW.

As shown in FIG. 3, when the first switch 82 is turned off, even if the ignition switch IGNSW is turned on, current is not supplied to the coil C2 of the main contactor 76. Thus, the switch SW2 of the main contactor 76 is not turned on. Accordingly, the first switch 82 is a switch to permit the main contactor 76 (switch SW2 of the main contactor 76) to turn on. When the first switch 82 is turned on, the main contactor 76 is permitted to turn on. When the first switch 82 is turned off, the main contactor 76 is inhibited to turn on.

A capacitor 80 is connected to the inverter 78 in parallel, thus stabilizing operation of the inverter 78, while the capacitor 80 is connected to the second switch 84 and the resistor 86 in parallel. The second switch 84 and the resistor 86, which are connected to the capacitor 80 in parallel, serve as a discharge circuit 88, which discharges the capacitor 80. The motor 28 is connected to the inverter 78, which converts direct current from the main battery 60 into three-phase alternating current so as to supply to the motor 28. Accordingly, the motor 28 drives.

In normal operation, as shown in FIG. 2, the first switch is turned on, while the second switch 84 is turned off. In discharge operation for discharging the electric charge of the capacitor 80, as shown in FIG. 3, the first switch 82 is turned off, while the second switch 84 is turned on. The first switch 82 and the second switch 84 are switches that interlock with each other to turn on or off. When the first switch 82 is turned on, the second switch 84 is turned off. When the first switch 82 is turned off, the second switch 84 is turned on.

In normal operation, when the ignition switch IGNSW is turned on, the electric current is carried from the sub battery 62 to the coil C1 and the coil C2. This excites the coil C1, thus turning on the switch SW1 of the precharge relay 70. Accordingly, the current from the main battery 60 is supplied to the capacitor 80 through the precharge relay 70, thus precharging the electric charge in the capacitor 80. The resistor 72 restricts the current carried to the capacitor 80. Then, the excitation of the coil C2 turns on the switch SW2 of the main contactor 76, thus enabling the supply of the electric power from the main battery 60 to the motor 28 through the inverter 78. This makes the motor 28 ready to drive.

When the main battery 60 is discharged and drops its voltage, the capacitor 80 is discharged to reduce the voltage drop of the main battery 60. When the main battery 60 raises its voltage, the capacitor 80 charges from the main battery 60 and raise its voltage in conjunction with the main battery 60. Accordingly, the inverter 78 and the capacitor 80, which are connected to one another in parallel, smooth voltage fluctuation of the main battery 60, thus stabilizing the operation of the inverter 78.

When an operator for maintenance or the like, or user (this person being referred to as operator or the like) accesses the motor drive section 64 (for dismounting and disassembling the motor drive section 64 to access its internal structure (electric circuitry)), if the capacitor 80 is charged, the electric charge of the capacitor 80 is possibly discharged. Accordingly, when accessing the motor drive section 64 for maintenance or the like, as shown in FIG. 3, the first switch 82 is turned off, while the second switch 84 is turned on. This connects the discharge circuit 88 to the capacitor 80, thus discharging the electric charge accumulated in the capacitor 80 through the discharge circuit 88.

Figure 4:
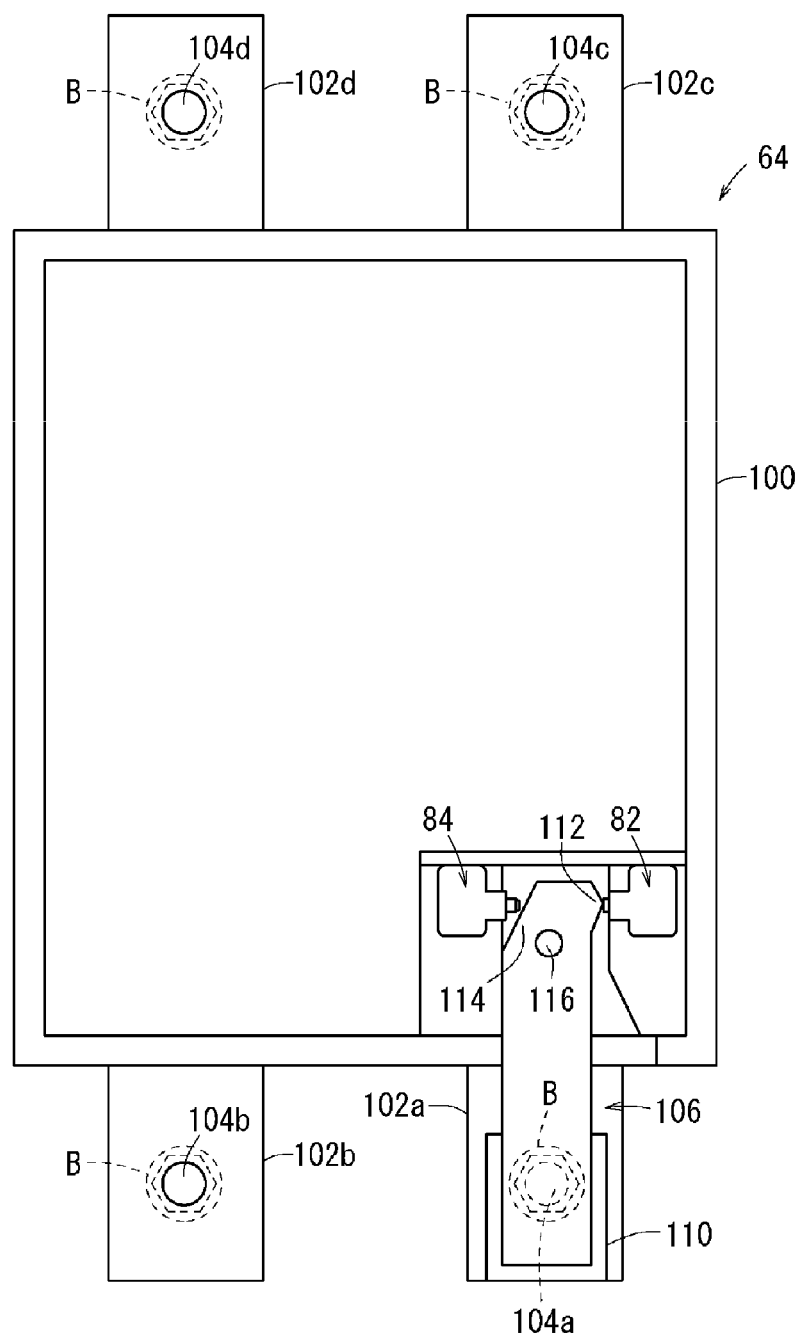
FIG. 4 is a plan view of the motor drive section shown in FIG. 1, for illustrating its perspective view.

FIG. 4 is a plan view of the motor drive section 64 shown in FIG. 1, for illustrating its perspective view. The motor drive section 64 has a body case 100 and mounting portions 102a, 102b, 102c, and 102d, which mount the body case 100 to the vehicle body frame 12. The mounting portions 102a, 102b, 102c, and 102d are formed with insertion holes 104a, 104b, 104c, and 104d, into which bolts B are inserted to fasten the mounting portions 102a, 102b, 102c, and 102d to the vehicle body frame 12. The bolts B fasten the body case 100 to the vehicle body frame 12.

On the upper surface of the body case 100, the first switch 82, the second switch 84, and discharge operation unit 106 are disposed. The discharge operation unit 106 is, in this example, a manual switch to turn on one of the first switch 82 and the second switch 84 and turn off the other. This discharge operation unit 106, acting as an example of a discharge operation means, is the manual switch interlocking the first switch 82 with the second switch in order to turn on or off.

The discharge operation unit 106 has a lever 110, a first pushing portion 112, a second pushing portion 114, and a plate shaft 116. The user operates the lever 110. The first pushing portion pushes the first switch 82 to turn on. The second pushing portion pushes the second switch 84 to turn on. The discharge operation unit 106 is able to turn about the plate shaft 116 in a horizontal direction. The first switch 82 and the second switch 84 are biased to turn off. The first switch 82 is turned on when pushed by the first pushing portion 112. The second switch 84 is turned on when pushed by the second pushing portion 114.

Figure 5:
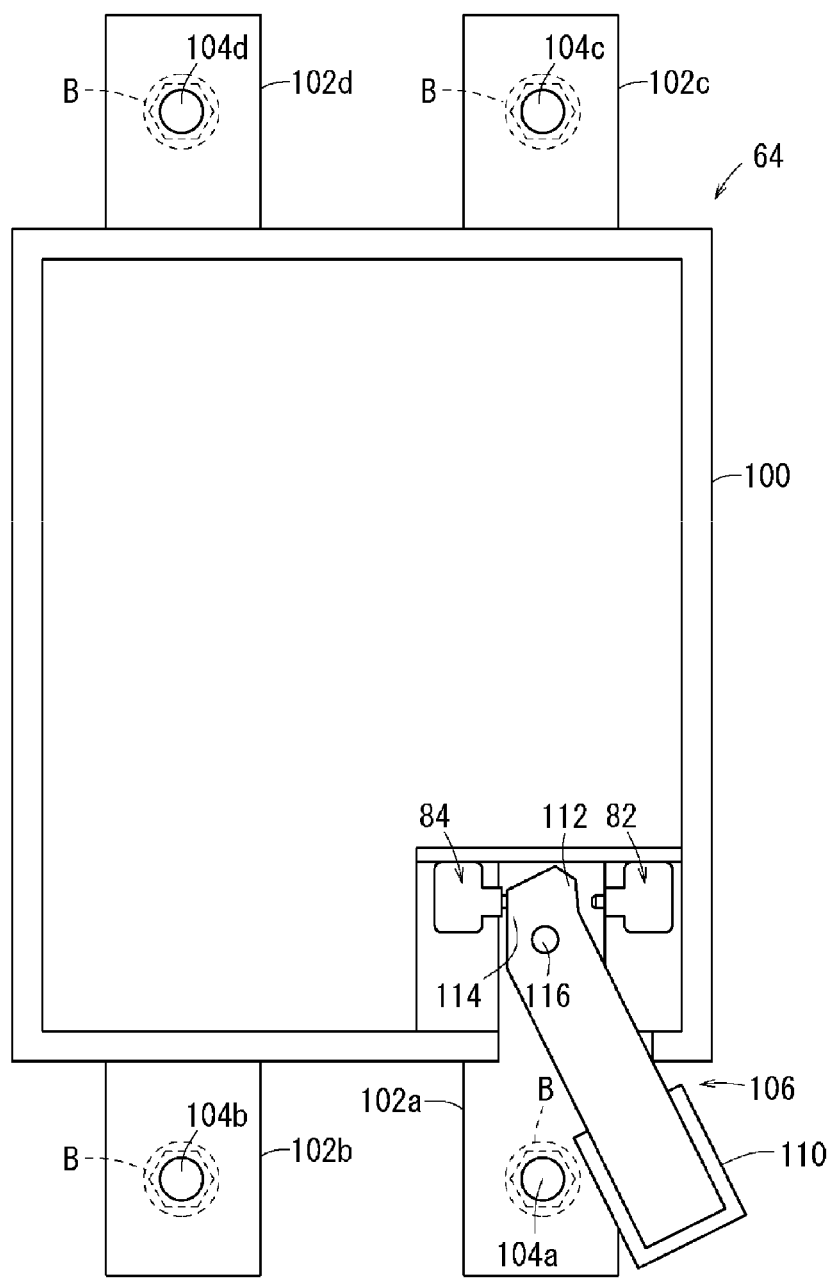
FIG. 5 is a plan view of the motor drive section when discharge operation means shown in FIG. 4 is turned.

In normal operation, the lever 110 of the discharge operation unit 106 is disposed at a position so as to cover the insertion hole 104a of the mounting portion 102a as shown in FIG. 4. In the normal operation, the first pushing portion 112 keeps the switch SW1 in ON state. When the user accesses the motor drive section 64, that is, when the motor drive section 64 is dismounted for maintenance or the like, the discharge operation unit 106 covers the insertion hole 104a of the mounting portion 102a. Thus, in order to unscrew the bolt B screwed into the insertion hole 104a, the lever 110 of the discharge operation unit 106 needs a turn in the counterclockwise direction as shown in FIG. 5. When the lever 110 is turned in the counterclockwise direction, the first pushing portion 112 moves away from the first switch 82 to turn off the first switch 82, while the second pushing portion 114 pushes the second switch 84 to turn on the second switch 84. As described above, when the first switch 82 is turned off, and the second switch 84 is turned on, the discharge circuit 88 is connected to the capacitor 80, thus discharging the electric charge from the capacitor 80.

Figure 6:
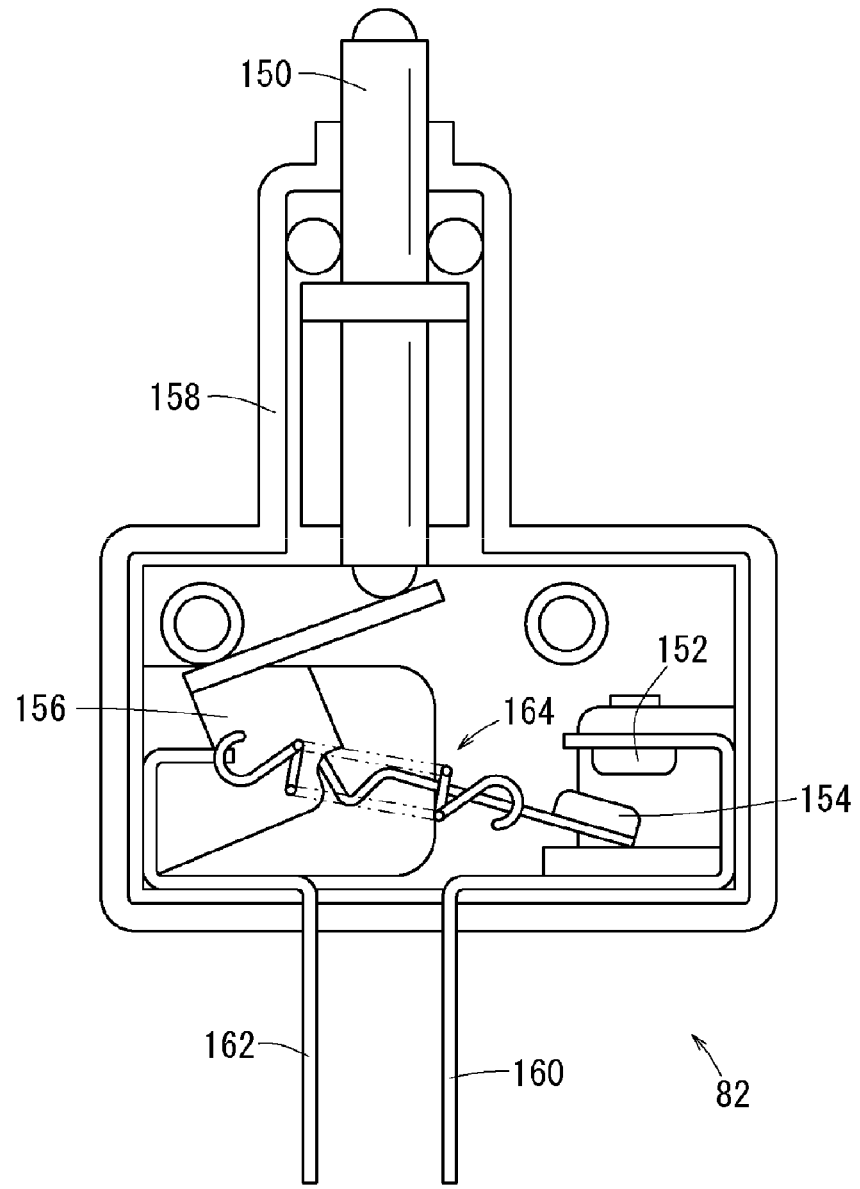
FIG. 6 is a plan cross-sectional view of a configuration of the first switch shown in FIG. 4 in a state where the first switch is turned off.
Figure 7:
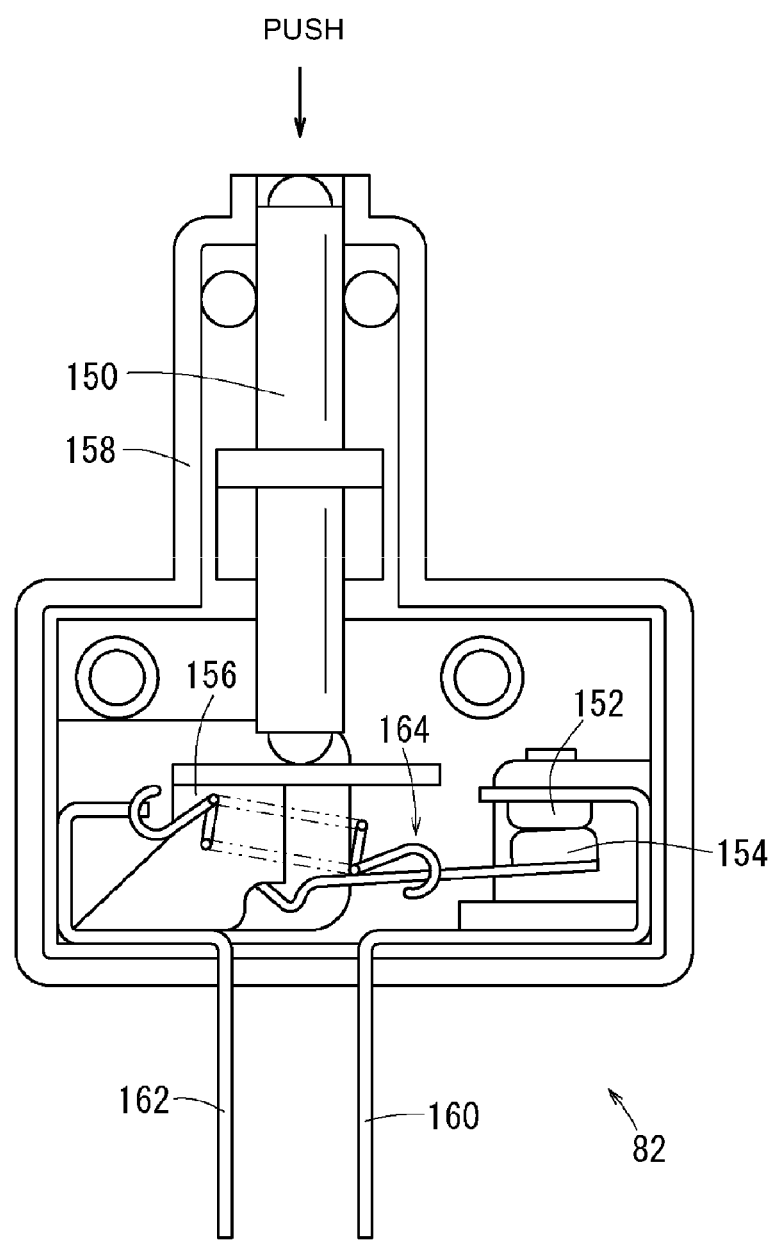

FIG. 6 and FIG. 7 are plan cross-sectional views of a configuration of the first switch 82. FIG. 6 is a plan cross-sectional view of the first switch 82 in OFF state. FIG. 7 is a plan cross-sectional view of the first switch 82 in ON state. The second switch 84 has the same configuration as the first switch 82, and therefore the second switch 84 will not be further described here.

The first switch 82 has a shaft 150, an action plate 156, and a switch cover 158. The shaft is pushed by the first pushing portion 112 of the discharge operation unit 106. The action plate brings a first contacting terminal 152 and a second contacting terminal 154 in contact with one another in conjunction with the push of the shaft 150. The switch cover accommodates the shaft 150, the first contacting terminal 152, the second contacting terminal 154, and the action plate 156. The first contacting terminal 152 is connected to a wiring 160, which is connected to the positive electrode of the main battery 60, while the second contacting terminal 154 is connected to a wiring 162, which is connected to the inverter 78.

A biasing member 164 is disposed between the second contacting terminal 154 and the wiring 162. The biasing member urges the action plate 156 so as to turn off the first switch 82 (in a direction separating the first contacting terminal 152 and the second contacting terminal 154, and pushing the shaft 150 outward). As shown in FIG. 7, when the shaft 150 is pushed inward by the first pushing portion 112 of the discharge operation means 106, the action plate 156 operates against the biasing direction of the biasing member 164, thus bringing the second contacting terminal 154 into contact with the first contacting terminal 152.

As describe above, the resistor 86, which discharges the electric charge of the capacitor 80 for stabilizing the operation of the inverter 78, and the discharge operation unit 106, which manually makes the resistor 86 to discharge the electric charge of the capacitor 80, are provided. These enable the discharge of the electric charge accumulated in the capacitor 80 when accessing the motor drive section 64 during maintenance, thus ensuring the easy accessibility to the motor drive section 64 as an electronic component.

The discharge operation unit 106 is disposed such that the motor drive section 64 is not accessible unless the discharge operation means 106 is manually operated when accessing the motor drive section 64. Accordingly, it is necessarily discharged when accessing the motor drive section 64.

The discharge operation unit 106 in this embodiment is a manual switch to connect the discharge circuit 88, which includes the resistor 86, to the capacitor 80, thus ensuring the discharge of the electric charge of the capacitor 80.

The motor drive section 64 is interposed between the main battery 60 and the motor 28, and has the main contactor 76, the first switch 82, and the second switch 84. The main contactor connects the main battery 60 and the inverter 78 of the motor drive section 64. The first switch permits the main contactor 76 to turn on. The second switch connects the discharge circuit 88 to the capacitor 80. The discharge operation unit 106 turns on one of the first switch 82 and the second switch 84 and turns off the other. Thus, when discharging the electric charge of the capacitor 80, the main contactor 76 is turned off. This prevents the motor drive section 64 from driving the motor 28 when accessing the motor drive section 64.

In the above-described embodiment, the circuit is so configured that when the ignition switch IGNSW is turned on, the current is automatically carried from the sub battery 62 to the coil C1 of the precharge relay 70 and the coil C2 of the main contactor 76, thereby automatically turning on the precharge relay 70 and the main contactor 76. The ECU 66 may control on and off of the precharge relay 70 (switch SW1 of the precharge relay) and on and off of the main contactor 76 (switch SW2 of the main contactor 76). In this configuration, when the ignition switch IGNSW is turned on, the ECU 66 may turn on the precharge relay 70 to charge the capacitor 80. Then, the ECU 66 may turn off the precharge relay 70 and turn on the main contactor 76, simultaneously.

In the above-described embodiment, the discharge operation unit 106 is disposed at the position so as to cover the insertion hole 104a of the mounting portion 102a for mounting the body case 100 to the vehicle body frame 12. In the configuration where the body case 100 is composed of a base portion and a cover portion (not shown), the discharge operation unit 106 may be disposed at a position so as to cover an insertion hole, into which the bolt for mounting the cover portion to the base portion is inserted. Accordingly, in order to open the cover of the body case 100, it is necessary to operate the discharge operation unit 106 to unscrew the bolt, thus ensuring the discharge of the electric charge of the capacitor 80.

In the above-described embodiment, the electric vehicle 10 is described as an exemplary hybrid motorcycle. The electric vehicle 10 may be an electric motorcycle. Any other configuration is possible insofar as the electric vehicle 10 comprises a vehicle with a motor such as motor 28.

The present invention has been described with the preferred embodiments. The scope of the present invention is not limited to the above-described embodiments. Various modifications and improvements of the embodiments will become apparent to those skilled in the art. Embodiments thus modified and improved are also within the scope of the present invention according to the description of the claims. The parenthetical reference signs in claims are provided to facilitate the understanding of the present invention according to the reference signs in the accompanying drawings. Thus, the present invention is not limited to the elements with the reference signs.

REFERENCE SIGNS LIST

10 ... Electric vehicle
28 ... Motor
56 ... Seat
60 ... Battery
64 ... Motor drive section
70 ... Precharge relay
72 and 86 ... Resistor
76 ... Main contactor
78 ... Inverter
80 ... Capacitor
82 ... First switch
84 ... Second switch
88 ... Discharge circuit
106 ... Discharge operation unit

The invention claimed is:

1. An electric vehicle, comprising:
an inverter configured to convert direct current from a battery into alternating current;
a capacitor configured to stabilize an operation of the inverter;
a discharge unit configured to discharge electric charge of the capacitor; and
a discharge operation unit configured to control the discharge unit to discharge the electric charge of the capacitor,
wherein the inverter, the capacitor, the discharge unit, and the discharge operation unit are configured to form a motor drive section, and wherein the motor drive section is configured to supply electric power from the battery to a traveling motor, to drive the traveling motor, and
wherein the discharge operation unit is disposed such that the motor drive section is accessible by manually operating the discharge operation unit when accessing the motor drive section.

2. The electric vehicle according to claim 1, wherein the discharge operation unit is a manual switch connecting a discharge circuit including the discharge unit to the capacitor.

3. An electric vehicle, comprising:
an inverter configured to convert direct current from a battery into alternating current;
a capacitor configured to stabilize an operation of the inverter;
a discharge unit configured to discharge electric charge of the capacitor; and
a discharge operation unit configured to control the discharge unit to discharge the electric charge of the capacitor,
wherein the inverter, the capacitor, the discharge unit, and the discharge operation unit are configured to form a motor drive section, and wherein the motor drive section is configured to supply electric power from the battery to a traveling motor, to drive the traveling motor,
wherein the discharge operation unit is disposed such that the motor drive section is accessible by manually operating the discharge operation unit when accessing the motor drive section,
wherein the discharge operation unit is a manual switch connecting a discharge circuit including the discharge unit to the capacitor,
wherein the motor drive section is interposed between the battery and the traveling motor, and comprises a main contactor connecting the battery to the inverter of the motor drive section, a first switch permitting the main contactor to turn on, and a second switch connecting the discharge circuit to the capacitor, and
wherein the discharge operation unit is configured to interlock the first switch with the second switch in order to turn on one of the first switch and the second switch and turn off another of the first switch and the second switch.

4. The electric vehicle according to claim 1, further comprising a seat configured to support a rider,
wherein the motor drive section is disposed below the seat.

5. An electric vehicle, comprising:
inverter means for converting direct current from a battery into alternating current;
capacitor means for stabilizing an operation of the inverter means;
discharge means for discharging electric charge of the capacitor means; and
discharge operation means for controlling the discharge means to discharge the electric charge of the capacitor means,
wherein the inverter means, the capacitor means, the discharge means, and the discharge operation means form a motor drive means, and wherein the motor drive means is for supplying electric power from the battery to a travelling motor means for providing motive force for the vehicle, to drive the traveling motor means, and
wherein the discharge operation means is disposed such that the motor drive means is accessible by manually operating the discharge operation means when accessing the motor drive means.

6. The electric vehicle according to claim 5, wherein the discharge operation means comprises a switch means connecting the discharge means to the capacitor means.

7. An electric vehicle, comprising:
inverter means for converting direct current from a battery into alternating current;
capacitor means for stabilizing an operation of the inverter means;
discharge means for discharging electric charge of the capacitor means; and
discharge operation means for controlling the discharge means to discharge the electric charge of the capacitor means,
wherein the inverter means, the capacitor means, the discharge means, and the discharge operation means form a motor drive means, and wherein the motor drive means is for supplying electric power from the battery to a travelling motor means for providing motive force for the vehicle, to drive the traveling motor means, wherein the discharge operation means is disposed such that the motor drive means is accessible by manually operating the discharge operation means when accessing the motor drive means, wherein the discharge operation means comprises a switch means connecting the discharge means to the capacitor means, wherein the motor drive means is interposed between the battery and the travelling motor means, and wherein the motor drive means comprises a main contactor for connecting the battery to the inverter means, first switch means for turning on the main contactor, and a second switch means connecting a discharge circuit of the discharge means to the capacitor means, and wherein the discharge operation means is for interlocking the first switch means with the second switch means in order to turn on one of the first switch means and the second switch means, and turn off another of the first switch means the second switch means.

8. The electric vehicle according to claim 5, further comprising seat means for supporting a rider, wherein the motor drive means is disposed below the seat means.

\* \* \* \* \*